Oct. 23, 1962 J. W. BLAIR 3,059,330
METHOD OF FORMING A PRESSURE SEAL
Filed July 21, 1958 2 Sheets-Sheet 1

INVENTOR.
JOHN W. BLAIR
BY
William P. Hickey
ATTORNEY

Oct. 23, 1962  J. W. BLAIR  3,059,330
METHOD OF FORMING A PRESSURE SEAL
Filed July 21, 1958  2 Sheets-Sheet 2

INVENTOR.
JOHN W. BLAIR
BY
William P. Hickey
ATTORNEY

United States Patent Office 3,059,330
Patented Oct. 23, 1962

1

3,059,330
METHOD OF FORMING A PRESSURE SEAL
John W. Blair, South Bend, Ind., assignor to The Bendix Corporation, a corporation of Delaware
Filed July 21, 1958, Ser. No. 749,992
7 Claims. (Cl. 29—525)

The present invention relates to new and improved means for pressure sealing a tubular member into an opening in a relatively thin plate; and will have particular utility for effecting such a seal in those applications where its assembly must be made quickly and inexpensively on a mass production basis.

An object of the present invention is the provision of a new and improved method of sealing a tube to an opening in a plate by the use of an interpositioned member wedged in place, and by which the members can be swiftly and easily placed into their final sealing position.

The invention resides in certain constructions and combinations and arrangements of parts; and further objects and advantages will become apparent to those skilled in the art to which the invention relates from the following description of the preferred embodiments described with reference to the accompanying drawings forming a part of this specification, and in which.

Figure 1:
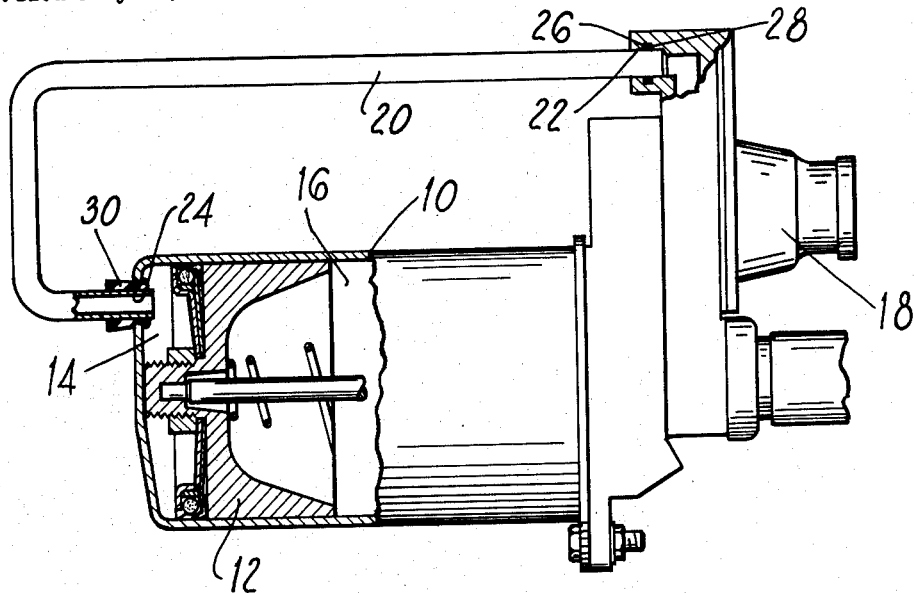
FIGURE 1 is a side elevational view of an air pressure operated power braking unit a portion of which is shown in section to better illustrate the invention.

The air pressure operated power braking unit shown in FIGURE 1 is of the type shown and described in T. H. Thomas Patent No. 2,661,598. To obtain a more complete understanding of its construction and operation reference may be had to that patent. Suffice it to say that the unit includes a power cylinder 10 that is formed by means of a sheet metal stamping formed into a cup-shaped cylinder member and which contains a power piston 12 which divides the cylinder into opposing fluid pressure chambers 14 and 16 respectively. In the normal condition of the servomotor, the power piston 12 is in the position seen in FIGURE 1—and in which condition, atmospheric pressure exists on opposite sides of the power piston. When the unit is actuated, air pressure in intensities up to approximately 125 p.s.i. is delivered to the opposing fluid pressure chamber 14 from its control valve 18 through a cane-shaped tubular member 20, one end of which is slipped into an opening 22 in the control valve body 18, and the other end of which is slipped into an opening 24 through the closed end wall of the power cylinder 10. According to principles of the present invention, sealing structure is provided for the opposite ends of the cane-shaped tubular member 20 which will effect a suitable pressure seal when the ends of the tubular member 20 are telescoped into position. The sealing structure for the opening 22 may be of any suitable type which will effect a seal when the end of the tubular member is positioned therein. In the embodiment shown in the drawing, this seal is effected by means of an O-ring 26 positioned in a recess 28 in the sidewalls of the opening 22.

The sealing structure for the opening 24 shown in FIGURE 1 is formed by means of a rubber grommet 30 whose outer surface is tapered so that one end thereof has a normal diameter which is slightly less than the diameter of the opening 24 while the other end of the rubber grommet has a diameter which is considerably greater than the diameter of the opening 24. The rubber grommet 30 is provided with a central opening therethrough having a normal diameter which is less than the diameter of the tubular member 20. In the preferred method of assembling the unit: the rubber grommet is inserted into the opening 24 until it is wedged therein to deform the rubber grommet a slight amount, the end of the tube 20 is dipped into a volatile lubricant such as denatured alcohol, the ends of the tube 20 are aligned with the openings 22 and 24 respectively, and the tubular member 20 is forced toward the unit to simultaneously insert both of its ends into the respective openings 22 and 24. When the end of the unit is inserted into the rubber grommet 30 the sidewalls of the rubber grommet are expanded outwardly to simultaneously effect a seal with respect to the tubular member 20 and at the same time wedge the sidewalls of the grommet more firmly against the sidewalls of the opening 24. In some instances it is possible to insert the tube 20 into the grommet 30 without the use of the alcohol, but in many instances the alcohol is necessary to act as a lubricant in order to insert the tube into the grommet 30 without forcing the grommet 30 through the opening 24. When the tube 20 is assembled and air pressure is admitted to the chamber 14, it has been found that the tube 20 tends to be slightly withdrawn from the opening 24, and that this withdrawing movement carries the rubber grommet 30 along with it with practically no slippage therebetween to bulge the rubber grommet 30 up against the inner face of the power cylinder 10. The O-ring 26 provided for sealing the other ends of the tubular member 20 must be positioned a sufficient distance from its end of the tube 20 in order to accommodate the slight amount of movement which is encountered when the tubular member 20 is subjected to pressure. The sealing structure shown in FIGURE 1 has been subjected to 275 p.s.i. air pressure before failing. In this test, the grommet 30 was not moved appreciably with respect to the tubular member 20 but had merely flowed around the edges of the opening 24 to permit the tubular member 22 to be blown out of its opening 24.

Figure 7:
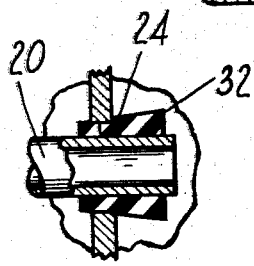
FIGURE 7 is a fragmentary cross sectional view of the same parts shown in FIGURE 1 assembled in a slightly different manner.

It will be seen that the method of assembly used in FIGURE 1 has the advantage of permitting the air pressure motor to be entirely assembled; the rubber grommet 30 to be pressed into the opening 24 from the outside of the motor; and the tubular member 20 to thereafter be merely inserted into position. In some instances where the sealing structure is to be used to seal higher pressures, it may be to advantage to force the grommet 30 into the opening 24 from the pressure side of the opening as illustrated in FIGURE 7 and to thereafter press the end of the tube member 20 into the rubber grommet. There is a tendency when using this method of assembly to force the rubber grommet 30 through the opening 24 so that the rubber grommet 30 will sometimes need to be held in position while the tubular member 20 is being forced into position. In the majority of instances, however, it has been found that if the rubber grommet 30 is wedged into position and the end of the tube 20 is well lubricated with alcohol, that the tube can be inserted into the smaller diameter end of the grommet without forcing it out of the opening 24.

Figure 2:
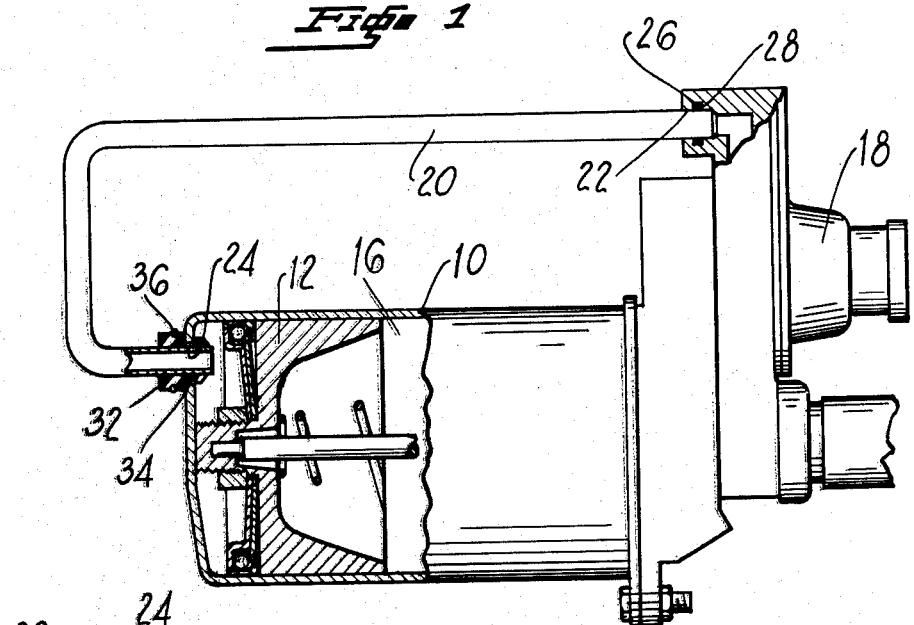
FIGURE 2 is a side elevational view similar to that shown in FIGURE 1 and illustrating another embodiment of the invention.

A further refinement of the invention is seen in FIGURE 2 of the drawings wherein the seal is effected by means of a rubber grommet 32 having an annular recess 34 in its outer surface. The rubber grommet 32 is preferably molded with an interference fit of approximately .020 of an inch between the bottom surface of its annular recess 34 and the sidewalls of the opening 24, and has the advantage over the rubber grommet 30 in that there is a pre-cast portion of the grommet which engages the inside wall of the power chamber surrounding its opening 24. The rubber grommet 32 is assembled in the same manner as described for the rubber grommet 30 as seen in FIGURE 1—the rubber grommet being sufficiently pliable as to permit its end to be deformed or squeezed together sufficiently to permit its end to be forced through the opening 24 and thereafter snap radially outwardly into position to engage the walls of the opening 24. The rubber grommet which is current being used is molded from butyl rubber, and the recess of which has a depth of approximately .05 of an inch. The inner surface of the recess in turn is provided with approximately .05 of interference fit on a side with respect to the opening in which it is inserted, and the diameter of the hole through the grommet is also provided with an interference fit of approximately .05 of an inch on the radius with respect to the tubular member 20. In some instances a wire snap ring 36 has been positioned on the outer end of the rubber grommet to effect a further seal between the grommet and the tubular member 20.

Figure 3:
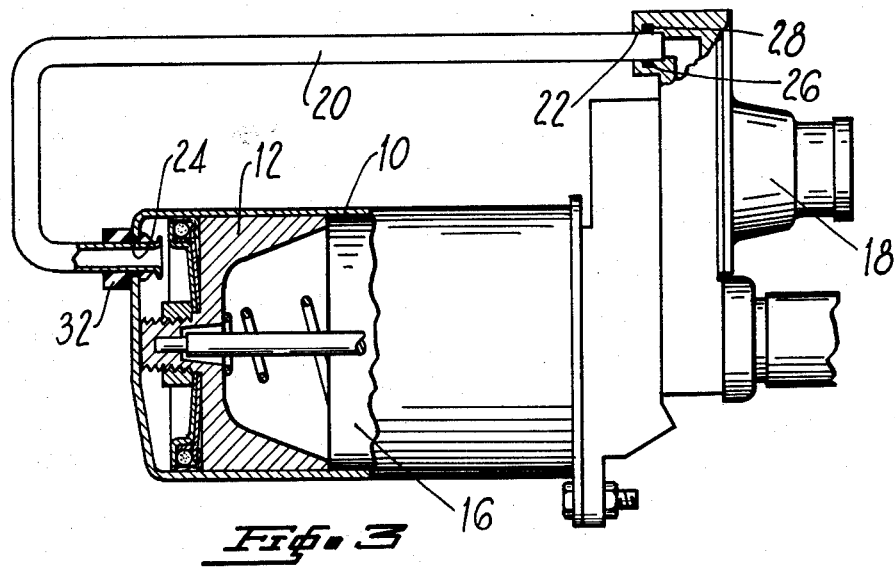
FIGURE 3 is a side elevational view similar to FIGURE 1 and showing still another embodiment of the invention.
Figure 4:
FIGURE 4 is a diametric view of one-half of the sealing member shown in FIGURE 1.
Figure 5:
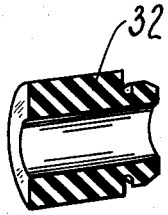
FIGURE 5 is a diametric view of one-half of the sealing member shown in FIGURE 2.
Figure 6:
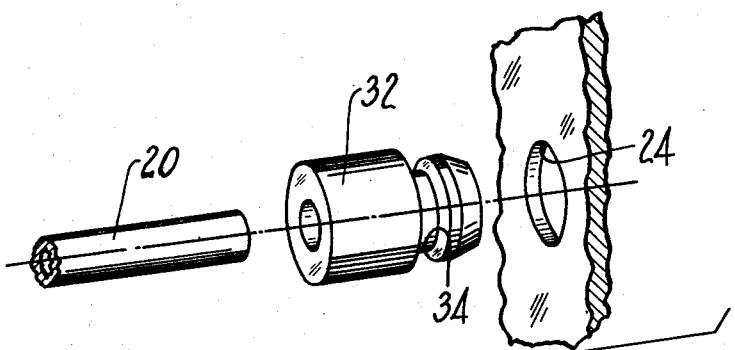
FIGURE 6 is a diametric view of the parts shown in FIGURE 2 in an aligned arrangement prior to their assembly.

In high pressure applications, it may in some instances be desirable to positively insure that the tubular member 20 cannot be withdrawn from the opening 24 once the power unit is assembled. This may be required, for example, in order to meet certain Interstate Commerce Commission regulations and/or State laws. In order to make it impossible to withdraw the tubular member 20 once the unit is assembled, the construction shown in FIGURE 3 might be utilized wherein the end of the tubular member 20 is flared over to make it impossible for the tube to be withdrawn through the opening 24. In those instances when a rubber grommet 32 is to be used, the grommet 32 may be positioned in the opening 24 and the long end of the tubular member 20 passed through the opening in the grommet from the inside of the power cylinder 10 until the flange end of the tube 20 is brought approximately into position. Where such an assembly is to be used, the inside diameter of the power cylinder 10 will be greater than the width of the bent portion of the tube so that the entire bent portion may be fed down through the inside of the power chamber, and the bent portion thereafter threaded through the opening 24. Where the flared end tubular member 38 is to be used with a rubber grommet 30 the tubular member 38 may first be threaded through the opening 24, and thereafter the rubber grommet 30 may be slid down the entire length of tubing until it becomes wedged in place. Thereafter a slight withdrawal of the flared end of the tubing 38 may be used to more firmly wedge the grommet 30 into place.

It will be apparent that the constructions and procedures above described will have utiltiy in many other applications where pressure seals between tubes and openings through relatively thin members are required; and that the sealing structures so provided will be equally effective for both positive and negative pressures.

While the invention has been described in considerable detail, I do not wish to be limited to the particular constructions and methods shown and described; and it is my intention to cover hereby all novel adaptations modifications and arrangements thereof which come within the practice of those skilled in the art to which the invention relates.

I claim:

1. A method of forming an air pressure seal between a relatively thin plate having a cylindrically shaped opening therethrough and a tubular conduit comprising: forming a resilient generally tubular grommet having a length greater than the width of said plate and a longitudinal opening therethrough of a diameter that is less than the outside diameter of said tubular conduit, said grommet having an outer plate opening receiving surface which is larger in diameter than said opening in said plate; forcing said grommet into said plate opening until the plate opening receiving surface of said grommet is in tight engagement with the sidewalls of said plate opening and so that at least some of said surface projects outwardly of the pressure side of said plate; and forcing said end of said conduit through the opening in said grommet to expand said plate opening receiving surface of said grommet into tight sealing engagement with the sidewalls of said opening in said plate and with a portion thereof bulged against the pressure side of said plate; and whereby pressure differential across said plate causes said grommet to bulge up against the plate to further increase its sealing engagement and prevent its removal from the opening in said plate.

2. A method of forming an air pressure seal between a relatively thin plate having a cylindrically shaped opening therethrough and a tubular conduit comprising: forming a resilient generally tubular grommet having a length greater than the width of said plate and a longitudinal opening therethrough of a diameter that is less than the outside diameter of said tubular conduit, said grommet having an outer plate opening receiving surface which is larger in diameter than said opening in said plate; forcing said grommet into said plate opening until the plate opening receiving surface of said grommet is in tight engagement with the sidewalls of said plate opening and so that at least some of said surface projects outwardly of the pressure side of said plate; dipping the end of said conduit in a volatile hydrocarbon; and forcing said end of said conduit through the opening in said grommet to expand said plate opening receiving surface of said grommet into tight sealing engagement with the sidewalls of said opening in said plate and with a portion thereof bulged against the pressure side of said plate; and whereby pressure differential across said plate causes said grommet to bulge up against the plate to further increase its sealing engagement and prevent its removal from the opening in said plate.

3. A method of forming an air pressure seal between a relatively thin plate having a cylindrically shaped opening therethrough and a tubular conduit comprising: forming a resilient generally tubular grommet having a length greater than the width of said plate and a longitudinal opening therethrough of a diameter that is less than the outside diameter of said tubular conduit, said grommet having a generally tapered outer plate opening receiving surface, one end of which is smaller than said opening in said plate and the other end of which is considerably larger than said opening in said plate; forcing the smaller diameter end of said grommet into said plate opening until the plate opening receiving surface of said grommet is in tight engagement with the sidewalls of said plate opening and so that at least some of said surface projects outwardly of the pressure side of said plate; dipping the end of said conduit in a volatile hydrocarbon; and forcing said end of said conduit through the opening in said grommet to expand said plate opening receiving surface of said grommet into tight sealing engagement with the sidewalls of said opening in said plate and with a portion thereof bulged against the pressure side of said plate; and whereby pressure differential across said plate causes said grommet to bulge up against the plate to further increase its sealing engagement and prevent its removal from the opening in said plate.

4. A method of forming an air pressure seal between a relatively thin plate having a cylindrically shaped opening therethrough and a tubular conduit comprising: forming a resilient generally tubular grommet having a length greater than the width of said plate and a longitudinal opening therethrough of a diameter that is less than the outside diameter of said tubular conduit, said grommet having an outer plate opening receiving surface which is larger in diameter than said opening in said plate; forcing said grommet into said plate opening until the plate opening receiving surface of said grommet is in tight engagement with the sidewalls of said plate opening and so that at least some of said surface projects outwardly of the pressure side of said plate; dipping the end of said conduit in a volatile hydrocarbon; and forcing said end of said conduit through the opening in said grommet to expand said plate opening receiving surface of said grommet into tight sealing engagement with the sidewalls of said opening in said plate and with a portion thereof bulged against the pressure side of said plate; and whereby pressure differential across said plate causes said grommet to further bulge up against the plate to further increase its sealing engagement and prevent its removal from the opening in said plate.

5. A method of forming an air pressure seal between a relatively thin plate having a cylindrically shaped opening therethrough and a tubular conduit comprising: forming a resilient generally tubular grommet having a length greater than the width of said plate and a longitudinal opening therethrough of a diameter that is less than the outside diameter of said tubular conduit, said grommet having a plate opening receiving recess in its outer surface, the inner surface of said recess being larger in diameter than said opening in said plate; forcing said grommet into said plate opening until the inner surface of said recess is in tight engagement with the sidewalls of said plate opening; dipping the end of said conduit in a volatile hydrocarbon; and forcing said end of said conduit through the opening in said grommet to expand the inner surface of said recess into tight sealing engagement with the sidewalls of said opening in said plate; and whereby pressure differential across said plate causes said grommet to bulge up against the plate to further increase its sealing engagement and prevent its removal from the opening in said plate.

6. A method of forming an air pressure seal between a relatively thin plate having a cylindrically shaped opening therethrough and a tubular conduit comprising: forming a resilient generally tubular grommet having a length greater than the width of said plate and a longitudinal opening therethrough of a diameter that is less than the outside diameter of said tubular conduit, said grommet having a generally tapered outer plate opening receiving surface, the diameter of one end of said grommet being less than the diameter of said plate opening and the other end of said grommet being considerably greater than the diameter of said plate opening, forcing said grommet into said plate opening until the plate opening receiving surface of said grommet is in tight engagement with the sidewalls of said plate opening and so that at least some of said surface projects outwardly of the pressure side of said plate; dipping the end of said conduit in a volatile alcohol; and forcing said end of said conduit through the opening in said grommet to expand said plate opening receiving surface of said grommet into tight sealing engagement with the sidewalls of said opening in said plate and with a portion thereof bulged against the pressure side of said plate; and whereby pressure differential across said plate causes said grommet to further bulge up against the plate to further increase its sealing engagement and prevent its removal from the opening in said plate.

7. A method of forming an air pressure seal between a relatively thin plate having a cylindrically shaped opening therethrough and a tubular conduit comprising: forming a resilient generally tubular grommet having a length greater than the width of said plate and a longitudinal opening therethrough of a diameter that is less than the outside diameter of said tubular conduit, said grommet having a plate opening receiving recess in its outer surface, the inner surface of said recess being larger in diameter than said opening in said plate; forcing said grommet into said plate opening until the inner surface of said recess is in tight engagement with the sidewalls of said plate opening; dipping the end of said conduit in a volatile alcohol; and forcing said end of said conduit through the opening in said grommet to expand the inner surface of said recess into tight sealing engagement with the sidewalls of said opening in said plate; and whereby pressure differential across said plate causes said grommet to bulge up against the plate to further increase its sealing engagement and prevent its removal from the opening in said plate.

References Cited in the file of this patent

UNITED STATES PATENTS

| | | |
|---|---|---|
| 1,824,492 | Morris | Sept. 22, 1931 |
| 2,211,780 | Jacobs | Aug. 20, 1940 |
| 2,223,153 | Seifer | Nov. 26, 1940 |
| 2,225,472 | Franklin | Dec. 17, 1940 |
| 2,665,146 | Berg et al. | Jan. 5, 1954 |
| 2,739,374 | Kaiser | Mar. 27, 1956 |
| 2,759,255 | Prince | Aug. 21, 1956 |
| 2,772,034 | Richmond | Nov. 27, 1956 |
| 2,874,981 | Brady | Feb. 24, 1959 |
| 2,897,533 | Bull et al. | Aug. 4, 1959 |
| 2,912,712 | Shamban et al. | Nov. 17, 1959 |
| 2,967,067 | Singer | Jan. 3, 1961 |